United States Patent [19]

Purcell et al.

[11] Patent Number: 5,719,802

[45] Date of Patent: Feb. 17, 1998

[54] ADDER CIRCUIT INCORPORATING BYTE BOUNDARIES

[75] Inventors: Stephen C. Purcell, Mountain View; John Sheldon Thomson, Santa Clara, both of Calif.

[73] Assignee: Chromatic Research, Inc., Mountain View, Calif.

[21] Appl. No.: 577,032

[22] Filed: Dec. 22, 1995

[51] Int. Cl.[6] .................................................. G06F 7/50
[52] U.S. Cl. ...................................... 364/786; 364/749
[58] Field of Search ................................. 364/786, 787, 364/788, 749

[56] References Cited

U.S. PATENT DOCUMENTS

| | | | |
|---|---|---|---|
| 4,914,617 | 4/1990 | Putrino et al. | 364/786 |
| 5,327,369 | 7/1994 | Ashkenazi | 364/749 |
| 5,418,736 | 5/1995 | Widigen et al. | 364/786 |
| 5,432,728 | 7/1995 | Curtet | 364/786 |

Primary Examiner—David H. Malzahn
Attorney, Agent, or Firm—Skjerven, Morrill, MacPherson, Franklin & Friel; Edward C. Kwok

[57] ABSTRACT

In accordance with the present invention, an adder is disclosed which combines byte boundary control signals with propagate-generate signal pairs immediately resulting from bit pairs of the input signals. Combining the byte boundary control signals with the first level propagate-generate signal pairs, rather than combining the byte boundary control signals with propagate-generate signal pairs indicative of the carry-out of a byte, allows the adder to utilize a more efficient tree signal path topology in which multiple levels of circuitry may be eliminated, thereby resulting in a reduction in propagation delay.

4 Claims, 5 Drawing Sheets

ADDER CIRCUIT INCORPORATING BYTE BOUNDARIES

BACKGROUND

It is desirable for an adder to be capable of performing arithmetic of various bit lengths. For example, a 2-input 36-bit adder should be able to perform one 36-bit addition e.g. A[35:0]+B[35:0] (word mode), two 18-bit additions e.g. A[35:18]+B[35:18] and A[17:0]+B[17:0] (half mode), or four 9-bit additions e.g. A[35:27]+B[35:27], A[26:18]+B[26:18], A[17:9]+B[17:9], and A[8:0]+B[8:0] (byte mode).

When "partitioning" an adder as described above, special care must be given to the carry propagation across byte boundaries. In byte mode, the carry-in bit $C_{in}$ to the least significant bit (LSB) of each byte should be a zero when adding and a one when subtracting. Thus, when adding in byte mode, the carries are blocked at each byte boundary, that is, the $C_{in}$ to the 0, 9th, 18th, and 26th bit positions are zero. Accordingly, the four pairs of bytes may then be added independently of one another. Note that when subtracting, $C_{in}$ across all byte boundaries is set to one.

In a similar manner, when adding/subtracting two 18-bit half words, $C_{in}$ to bit position 18 (as well as to bit position 0) is set equal to zero for addition and one for subtraction while the $C_{in}$'s within each half-word are allowed to propagate, i.e., the $C_{in}$'s to bit positions 9 and 27 are not forced low during addition (or high during subtraction). Note that since there are no boundaries when adding or subtracting in word mode, carry propagation is not blocked across any of the byte boundaries. Note that $C_{in}$ to the 0 bit position is always equal to zero for addition and always equal to one for subtraction.

FIG. 1 is a block diagram illustrating the carry propagate-generate signal paths employed by a conventional partitioned 2-input 36-bit adder 10 to generate the carries across the byte boundaries of a resultant 37-bit output signal (not shown) generated thereby. Thus, in response to two 36-bit input signals A[35:0] and B[35:0], adder 10 generates the carry-out signals $C_{byte3}$, $C_{byte2}$, $C_{byte1}$, and $C_{byte0}$ which, as described below, are selectively passed across the byte boundaries of the resultant 37-bit signal (not shown).

The operation of adder 10 is as follows. Referring also to FIG. 2A, respective bit-pairs $A_x$, $B_x$ of inputs signals A[35:0] and B[35:0] are provided to associated ones of a group of thirty-six circuits 12. Each of circuits 12, in response to bits $A_x$, $B_x$, creates a respective first generation propagate-generate pair $P_x$, $G_x$. These circuits 12 introduce the first gate delay in the generation of carry-out signals $C_{byte3}$, $C_{byte2}$, $C_{byte1}$, $C_{byte0}$ and are thus collectively denoted level-1 in FIG. 1. The 2-bit propagate-generate pairs $P_x$, $G_x$ resulting from the combination of the upper eight bits of each byte of respective inputs signals A[35:0] and B[35:0] are provided in pairs to sixteen circuits 14 which, as illustrated in FIG. 2B, create therefrom second generation propagate-generate pairs $P_{x+1,x}$, $G_{x+1,x}$. These group of sixteen circuits 14 introduce the second gate delay in the signal path illustrated in FIG. 1 and are thus collectively denoted as level-2. The sixteen propagate-generate pairs output from the sixteen level-2 circuits 14 are combined in pairs and reduced to eight propagate-generate pairs via eight level-3 circuits 14, which are then reduced to four propagate-generate pairs via four level-4 circuits 12, and so on until the respective pairs of the upper eight bits of each byte of input signals A[35:0], B[35:0] are each reduced to a single propagate-generate pair at nodes 16, 16b, 16c, and 16d, respectively. The propagate-generate pairs resulting from the respective pairs of LSB of each byte of input signals A[35:0], B[35:0] are then combined with the propagate-generate signal pairs generated as described above at nodes 16a–16d via four level-5 circuits 14 to create at respective nodes 18a, 18b, 18c, and 18d propagate-generate pairs indicative of the carry-out bits resulting from the addition/subtraction of respective byte pairs of input signals A[35:0], B[35:0]. Thus, the propagate-generate pair signal at for instance node 16a represents the carry-bit resulting from an arithmetic operation of bits A[8:1], B[8:1], while the propagate-generate pair signal at node 18a represents the carry-bit resulting from an arithmetic operation of bytes A[8:0], B[8:0].

The carry-in bit to an arithmetic combination of signals A[35:0] and B[35:0] is encoded as a propagate-generate pair $C_{in}$ and combined with the node 18a propagate-generate signal pair via a level-6 circuit 14 to produce a propagate-generate pair at node 19. This propagate-generate signal pair at node 19 represents the carry-out across the byte boundary between byte0 and byte1 of the resultant signal (not shown) and is accordingly labelled $C_{byte0}$.

Byte pair A[17:9], B[17:9] is reduced in the manner described above to a single propagate-generate pair at node 18b. A byte boundary control signal BB1 is combined with carry-out signal $C_{byte0}$ via a level-7 circuit 14 and thereby selectably determines whether either a zero, a one, or $C_{byte0}$ is passed across the byte boundary and combined with the node 18b propagate-generate signal pair to create at node 21 a carry-out propagate-generate signal pair $C_{byte1}$. Signal $C_{byte1}$ is indicative of the carry-out bit resulting from the combination of byte pair A[17:9], B[17:9] and the signal pair at node 20.

Byte pairs A[26:18], B[26:18] and A[35:27], B[35:27] are each reduced to a single propagate-generate pair at nodes 18c and 18d, respectively. These signal pairs at nodes 18c and 18d are then combined with either a zero, a one, or $C_{byte1}$ and a zero, a one, or $C_{byte2}$, respectively, depending upon the values of byte boundary control signals BB2 and BB3, respectively, in the manner described above.

The particular values to which BB1, BB2, and BB3 are set, and thus whether a zero, a one, or a carry-out signal pair is passed across the respective byte boundaries of the resultant signal (not shown) output from adder 10, depends, as described above, upon the particular arithmetic operation adder 10 is performing. For instance, when performing word mode arithmetic BB1, BB2, and BB3 are set such that $C_{byte0}$, $C_{byte1}$, and $C_{byte2}$, respectively, are passed across the respective byte boundaries, while when in byte mode BB1, BB2, and BB3 are set so as to block any carry-outs across byte boundaries by forcing nodes 20, 22, and 24, respectively, to zero for addition and to one for substraction.

The use of byte boundary control signals BB1–BB3 as discussed above is effective in controlling whether to pass carry-outs across byte boundaries so as to allow adder 10 to perform arithmetic operations in either byte, half, or word modes. However, the inclusion of such byte control signals in adder 10 results in a topology having twelve series-connected circuits 12 and, thus, results in a total propagation delay equal to approximately twelve times the propagation delay of circuit 14. It would thus be desirable to implement byte boundary control signals in a manner which results in a much smaller total propagation delay and which saves expensive silicon real estate.

SUMMARY

In accordance with the present invention, an adding circuit is disclosed which combines byte boundary control signals with first generation propagate-generate signal pairs produced by the combination of input signal bit pairs. Combining the byte boundary control signals with the first generation propagate-generate signal pairs, as opposed to first reducing byte pairs of the input signals into single propagate-generate pairs and then combining them with byte boundary control signals, allows the adder to utilize a more efficient tree signal path topology in which multiple level of circuitry may be eliminated, thereby resulting in a savings of silicon real estate and a reduction in propagation delay of the signal path.

DETAILED DESCRIPTION

Figure 1:
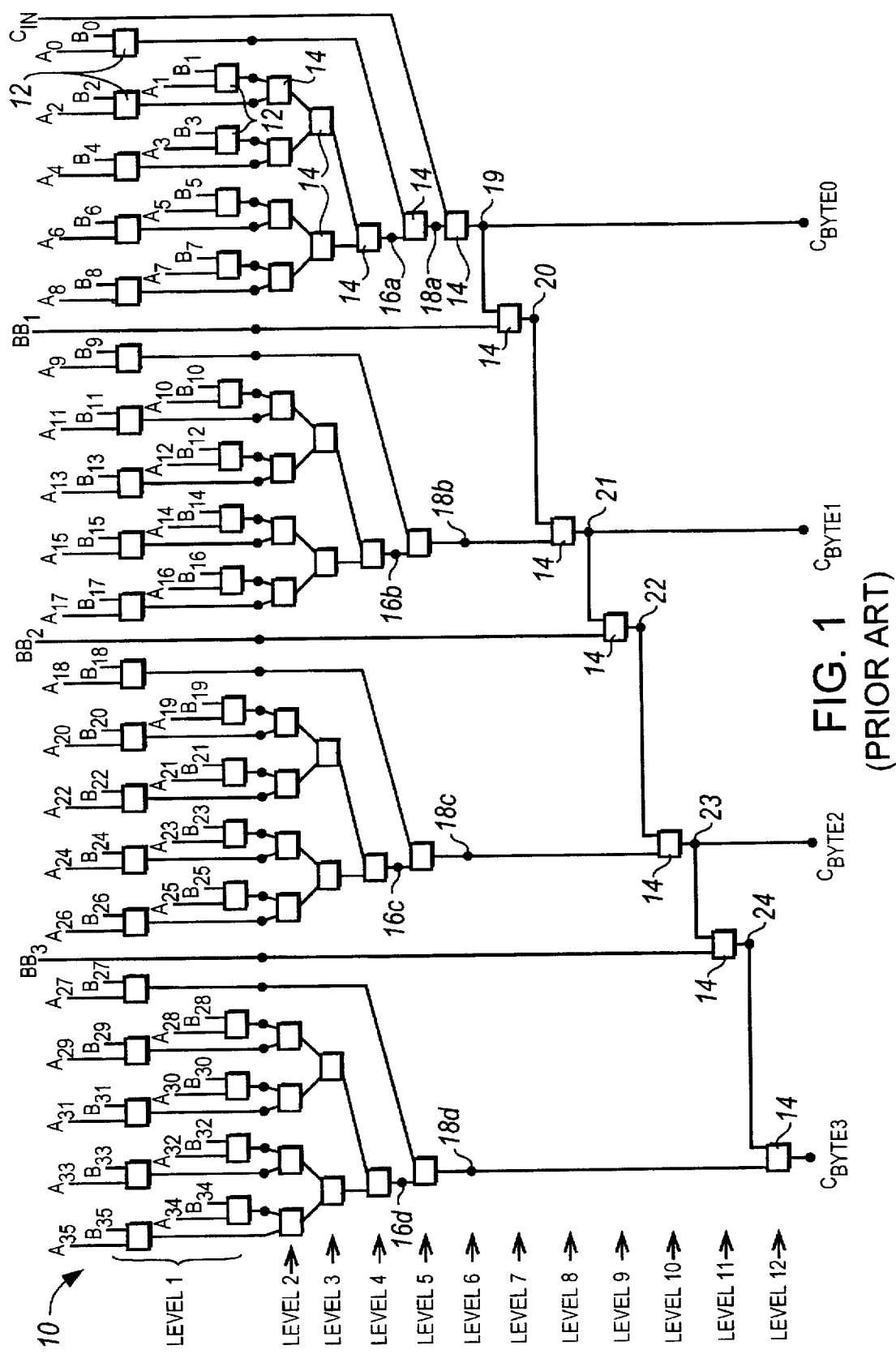
FIG. 1 is a block diagram illustrating the signal path of a portion of a conventional partitioned adder 10.
Figure 2A:
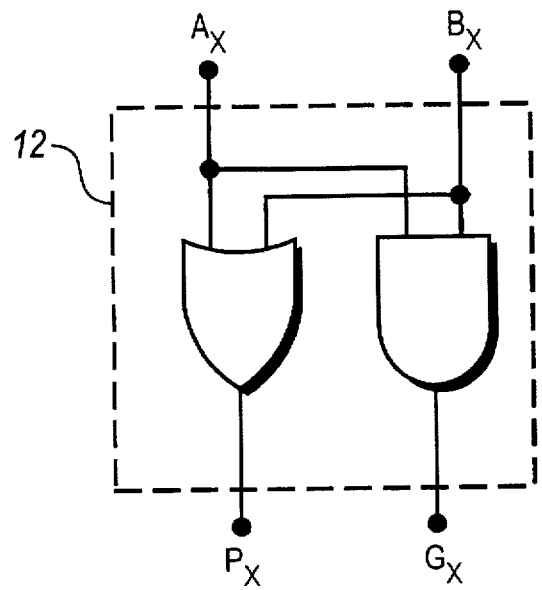
FIG. 2A is a schematic diagram of a conventional circuit which creates propagate-generate signal pairs from a pair of binary input signals.
Figure 2B:
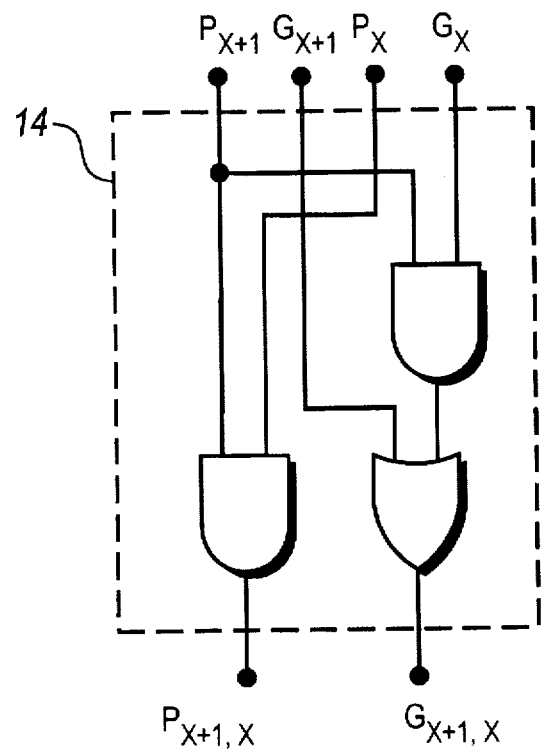
FIG. 2B is a schematic diagram of a conventional circuit which reduces two propagate-generate pairs to one new propagate-generate pair.
Figure 3:
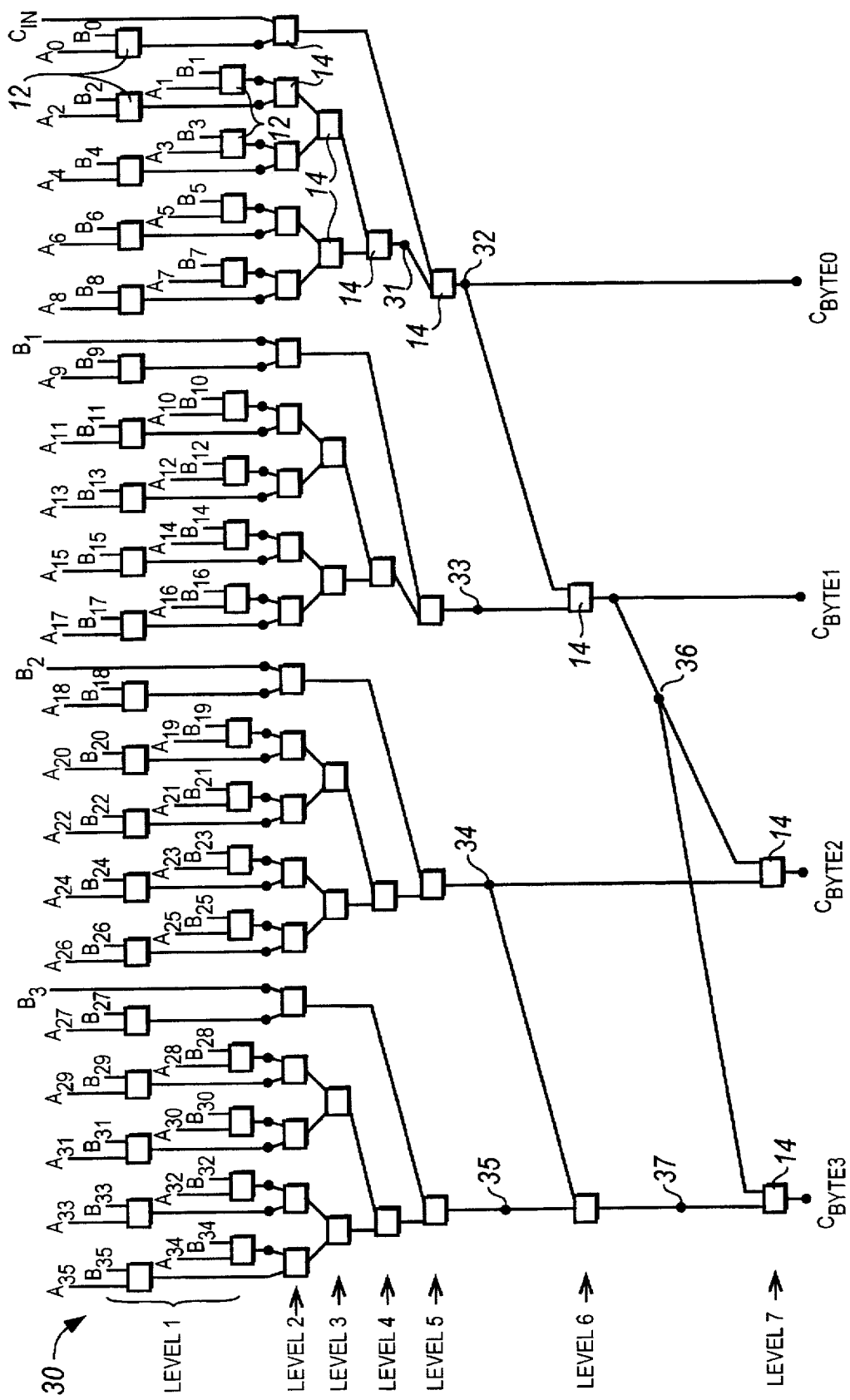
FIG. 3 is a block diagram illustrating the signal path for a partitioned adder in accordance with the preferred embodiment of the present invention.

FIG. 3 shows an adding circuit 30 in accordance with the present invention. Those components and signals common to adding circuit 30 and conventional adder 10 are similarly labelled. It is to be noted that although described below and referenced in FIG. 3 as a 2-input, 36-bit adding circuit 30, the principles of the invention disclosed herein are equally applicable to adding circuits of other widths.

The operation of adding circuit 30 allows for a significant reduction in total propagation delay by grouping carry-in signal $C_{in}$ and byte boundary control propagate-generate signals B1, B2, and B3 with first generation propagate-generate pairs resulting from adjacent ones of input signal pairs Ax, Bx, as shown in FIG. 3. Thus, for instance, rather than first reducing byte pairs A[8:0], B[8:0] to a single propagate-generate carry-out pair $C_{byte0}$ and then gating $C_{byte0}$ with byte boundary control signal B1, signal B1 is combined in a level-2 circuit 14 with the propagate-generate pair created from input bit pair $A_9$, $B_9$ via circuit 12 in the same manner as are first generation propagate-generate pairs converted from input signal bit pairs. Byte boundary control signals B1, B2, and B3 selectably determine, as described earlier with respect to respective signals BB1, BB2, and BB3 employed in the operation of conventional adder 10, whether a zero, a one, or a carry-out signal is passed across the respective byte boundaries.

The propagate-generate signal pairs resulting from the combination of each byte pair of input signals A[35:0] and B[35:0] and respective signals $C_{in}$, B1, B2, and B3 are combined and reduced to a single propagate-generate signal pair at nodes 32, 33, 34, and 35, respectively, via sixteen level-2, eight level-3, four level-4, and four level-4 circuits 14. Carry-in signal pair $C_{in}$ is combined with the signal pair of node 31 via a level-5 circuit 14 to produce carry-out signal pair $C_{byte0}$. Signal pair $C_{byte0}$, which as described above is indicative of the carry-out bit resulting from the arithmetic combination of bytes A[9:0], B[9:0], is passed across the byte0-byte1 boundary and combined with the single propagate-generate pair produced at node 33 as described above from the combination of bytes A[17:0] and B[17:0] and signal B1. The resultant carry-out signal pair, $C_{byte1}$, is then combined with the signal at node 34 in a level-7 circuit 14 to produce carry-out signal $C_{byte2}$. The signal at node 35, indicative of the carry-out bit resulting from the combination of bytes A[35:27] and B[35:27] and byte boundary control signal B3, is gated with the signal at node 34 via a level-6 circuit 14, the result of which is then gated with $C_{byte1}$ to produce carry-out signal $C_{byte3}$.

Carry-in signal $C_{in}$ and byte boundary control signals B1, B2 and B3 control the carry-in to byte0, from byte0 to byte1, from byte1 to byte2, and from byte2 to byte3, respectively, according to truth table shown below in Table 1, where x is a don't care:

| control signal $B_n$ | value passed across byte boundary between $byte_{n-1}$ to $byte_n$ |
| --- | --- |
| 00 | zero |
| 01 | carry-in |
| x1 | one |

As can be seen from FIG. 3, the topology of adding circuit 30 results in a reduction in total propagation delay from approximately twelve times the propagation delay of circuit 14 to approximately seven times that the circuit 14, as compared to the operation of adder 10, thereby allowing adding circuit 30 to perform at increased speeds.

It is to be understood that tree structures other than that depicted in FIG. 3 may be employed. As long as the carry-in $C_{in}$ and byte boundary control signals B1, B2, and B3 are integrated within the propagate-generate signal pair creation before the bit pairs within each byte of the input signals are reduced to a single propagate-generate signal, the advantages of the present invention described above may still be realized.

Figure 4:
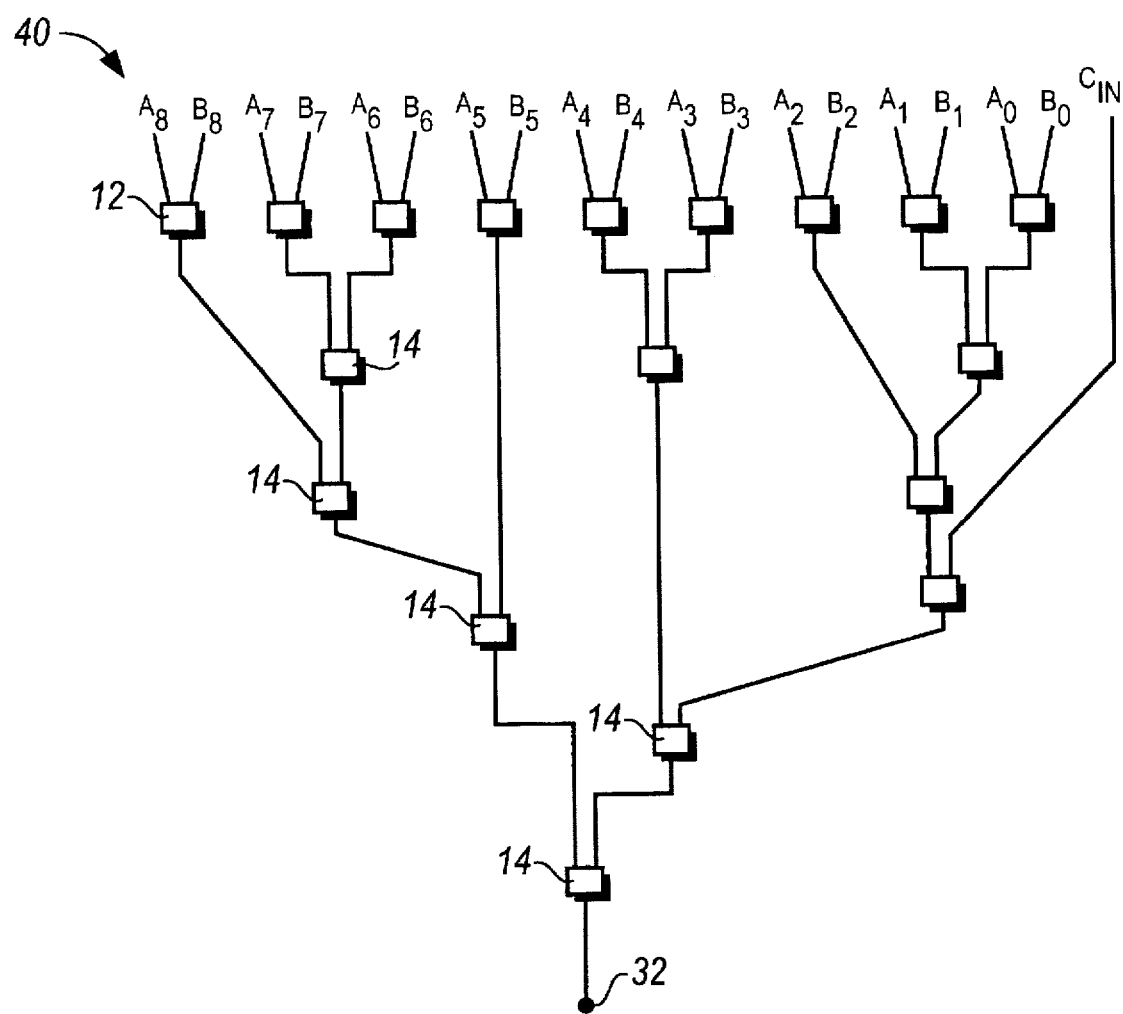
FIGS. 4 and 5 are block diagrams illustrating signals paths in accordance with other embodiments of the present invention.

For instance, FIG. 4 shows a portion 40 of another tree structure which may be used in accordance with the present invention to generate carry-out signals $C_{byte0}$, $C_{byte1}$, $C_{byte2}$, and $C_{byte3}$, where those components, signals, and nodes common to tree structure 40 and to adding circuit 30 (FIG. 3) are similarly labelled. Thus, although shown in FIG. 4 to generate the signal at node 32 from respective bit-pairs of lower bytes A[8:0], B[8:0], tree structure 40 may be used in a similar manner to generate the signals at nodes 33, 34, and 35.

Figure 5:
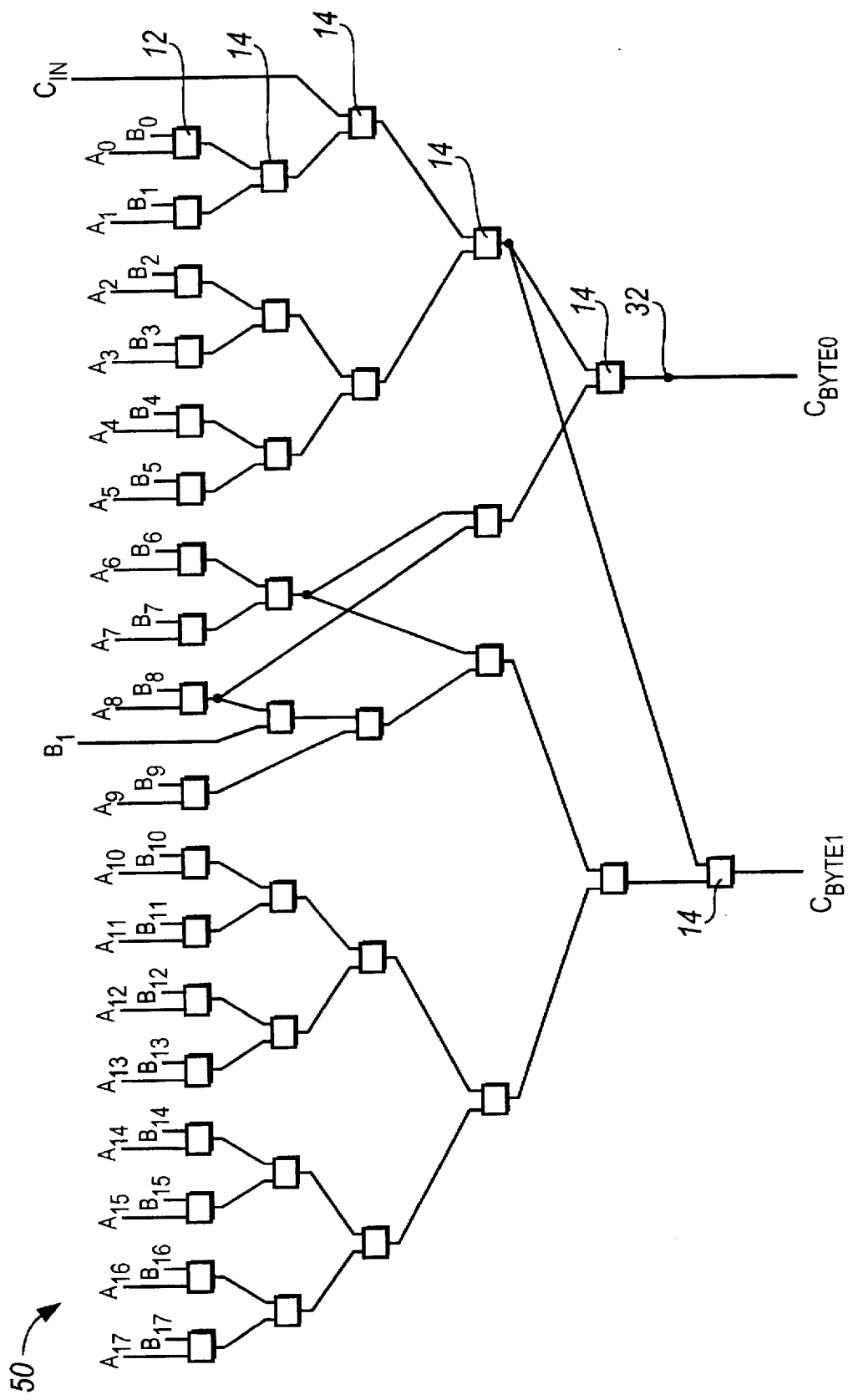

Referring now to FIG. 5, another tree structure 50 is shown which may, in accordance with the present invention, be employed within a larger circuit (not shown) as described below to generate carry-out signals $C_{byte0}$, $C_{byte1}$, $C_{byte2}$, and $C_{byte3}$. Tree structure 50 combines bit pairs from different bytes of the input signals during the generation of a particular carry-out signal. For instance, in calculating carry-out signal $C_{byte1}$, which is indicative of the carry-out bit generated by the arithmetic combination of $C_{byte0}$ and bytes A[17:9], B[17:9], byte boundary control signal B1 is first combined with the propagate-generate pair resulting from input bits A[8], B[8]. The propagate-generate signal pair resulting from input bits A[9], B[9] is then integrated therein, followed by the propagate-generate pair reduced from input bits A[6], B[6] and A[7], B[7]. The remaining bit pairs of input signals A and B are then combined and reduced as shown in FIG. 5 to create carry-out signal $C_{byte1}$.

In a similar manner, the tree structure of portion 50 may be used to produce the propagate-generate signals of nodes 34 and 35 (see FIG. 3). Several of such portions 50 may be coupled together using a structure similar to that of level-7 of FIG. 3 to create all of the resultant carry-out signals $C_{byte0}$, $C_{byte1}$, $C_{byte2}$, and $C_{byte3}$.

While particular embodiments of the present invention have been shown and described, it will be apparent to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method for selectively controlling a carry-bit propagated across a byte boundary of an output signal resulting from an arithmetic operation of first and second input signals, said method comprising the steps of:

(a) providing a byte boundary control signal pair;
    (b) combining in pairs respective bits of said first and second input signals to produce first propagate-generate signal pairs;
    (c) combining said byte boundary control signal pair with one of said first propagate-generate signal pairs to produce a second propagate-generate signal pair;
    (d) combining in pairs the remaining first propagate-generate signal pairs to produce additional second propagate-generate signal pairs;
    (e) combining all of said second propagate-generate signal pairs so as to reduce said second propagate-generate signal pairs to a final propagate-generate signal pair; and
    (f) determining, based upon said final propagate-generate signal pair, whether to propagate said carry bit, a logical one, or a logical zero across said byte-boundary.

2. A structure for selectively controlling a carry bit propagated across a byte boundary of an output signal resulting from an arithmetic operation of first and second input signals, said structure comprising:

means for receiving in pairs respective bits of said first and second input signals;
    means for converting the received pairs of bits of said first and second input signals into respective first-generation propagate-generate signal pairs;
    means for providing a byte boundary control signal pair;
    means for combining in pairs said first-generation propagate-generate pairs and said byte boundary control signal pair to produce second-generation propagate-generate signal pairs; and
    means for reducing said second-generation propagate-generate signal pairs to a single propagate-generate signal pair, said single propagate-generate signal pair indicative of whether a logical zero, a logic one, or said carry bit is propagated across said byte boundary.

3. The structure of claim 2 wherein said means for combining and said means for reducing comprise identical structures.

4. The structure of claim 2 wherein said means for combining comprises:

first and second input terminals for receiving the propagate and generate bits, respectively, of a first propagate-generate signal pair;
    third and fourth input terminals for receiving the propagate and generate bits, respectively, of a second propagate-generate signal pair;
    first and second output terminals for providing the respective propagate and generate bits of a resultant next-generation propagate generate signal pair;
    a first AND gate having first and second inputs coupled to said first and third input terminals, respectively, and having an output coupled to said first output terminal;
    a second AND gate having first and second inputs coupled to said first and fourth input terminals, respectively, and having an output; and
    an OR gate having first and second inputs coupled to said second input terminal and said output of said second AND gate, respectively, and having an output coupled to second output terminal.

* * * * *